United States Patent
Hundemer

(10) Patent No.: US 9,258,516 B2
(45) Date of Patent: Feb. 9, 2016

(54) NEWS PRODUCTION SYSTEM WITH DISPLAY CONTROLLER

(71) Applicant: Tribune Broadcasting Company, LLC, Chicago, IL (US)

(72) Inventor: Hank J. Hundemer, Bellevue, KY (US)

(73) Assignee: Tribune Broadcasting Company, LLC, Chicago, IL (US)

( * ) Notice: Subject to any disclaimer, the term of this patent is extended or adjusted under 35 U.S.C. 154(b) by 139 days.

(21) Appl. No.: 14/213,609

(22) Filed: Mar. 14, 2014

(65) Prior Publication Data

US 2015/0264295 A1  Sep. 17, 2015

(51) Int. Cl.
| | |
|---|---|
| *H04N 5/775* | (2006.01) |
| *H04N 5/93* | (2006.01) |
| *H04N 5/272* | (2006.01) |
| *H04N 5/222* | (2006.01) |
| *G11B 27/00* | (2006.01) |
| *H04N 21/262* | (2011.01) |
| *H04N 5/76* | (2006.01) |

(52) U.S. Cl.
CPC .............. *H04N 5/9305* (2013.01); *G11B 27/00* (2013.01); *H04N 5/2228* (2013.01); *H04N 5/272* (2013.01); *H04N 5/76* (2013.01); *H04N 21/26258* (2013.01)

(58) Field of Classification Search
CPC ....... H04N 5/775; H04N 5/85; H04N 9/8042; G11B 27/34; G11B 27/105
USPC .......................................................... 386/230
See application file for complete search history.

(56) References Cited

U.S. PATENT DOCUMENTS

| | | | |
|---|---|---|---|
| 6,141,007 A | 10/2000 | Lebling et al. | |
| 6,597,376 B1 * | 7/2003 | Windrem | H04N 5/265 348/E5.056 |
| 8,850,319 B2 * | 9/2014 | Stoen | H04L 12/581 715/704 |
| 2007/0011710 A1 * | 1/2007 | Chiu | H04L 51/04 725/95 |
| 2009/0319574 A1 | 12/2009 | Burgard et al. | |
| 2012/0236160 A1 * | 9/2012 | Rezek | H04N 5/232 348/207.11 |

FOREIGN PATENT DOCUMENTS

KR      1020090078168 A      7/2009

OTHER PUBLICATIONS

International Search Report and Written Opinion dated May 27, 2015, issued in connection with PCT Application No. PCT/US2015/017217 filed Feb. 24, 2015.

* cited by examiner

*Primary Examiner* — William Tran
(74) *Attorney, Agent, or Firm* — McDonnell Boehnen Hulbert & Berghoff LLP

(57) ABSTRACT

An example news production system includes a scheduling system, a composite display with multiple display panels, and a driver and a controller for the composite display. The controller receives data from the scheduling system. The controller then identifies a digital video effect to be run by the driver. The digital video effect involves the driver using an input video stream, at least in part, to generate output video streams for the display panels. In response, the controller prompts a user for an input, and then receives a timing signal based on a user input. In response to receiving the timing signal, the controller causes a video feed network to route the input video stream to the driver and causes the driver to run the digital video effect using the input video stream to thereby generate video streams to the composite display.

20 Claims, 4 Drawing Sheets

NEWS PRODUCTION SYSTEM WITH DISPLAY CONTROLLER

Throughout this application, with respect to all reasonable derivatives of such terms, and unless otherwise specified (and/or unless the particular context clearly dictates otherwise), each usage of:

"a" or "an" means at least one.
"the" means the at least one.
"video" means any material represented in a video format (i.e., having multiple frames). In some instances, video may include multiple sequential frames that are identical or nearly identical, and that may give the impression of a still image. Video may or may not include an audio portion.
"clip" means a portion of video.
"player" means a video player.

TECHNICAL FIELD

The disclosure generally relates to news production systems.

BACKGROUND

Unless otherwise indicated herein, the materials described in this section are not prior art to the claims in this disclosure and are not admitted to be prior art by inclusion in this section.

A news production system (NPS) may facilitate the production of a news program for television broadcast, or other broadcast. In this context, the news production system may produce a news program in accordance with a news program schedule (sometimes called a "rundown"), which specifies an order of events related to the production of the news program. For instance, a news program schedule may indicate that various clips are to be loaded and played out by a player in a particular order so that the clips may be part of the news program.

As another example, the news program schedule may indicate events in which video is captured via a camera on a news set. Such video capture events may involve capturing video of a news anchor (or another individual such as a reporter, correspondent, actor, or news personality) discussing news stories. The news program schedule may optionally include on-air scripts that may be provided to the news anchor via a teleprompter. In some instances, props or other visual aids may be used in connection with video capture events to illustrate certain aspects of the news stories.

SUMMARY

In one aspect, an example method for operating a display including a display panel in an NPS is disclosed. The method can include receiving data from a scheduling system of the NPS. The method can include identifying, based on the received data, a digital video effect (DVE) to be run by a display driver for the composite display. Running the identified DVE can involve using an input video stream, at least in part, to generate an output video stream for the display. The method can include prompting a user for an input in response to identifying the DVE. The method can include receiving a timing signal based on a user input. In response to receiving the timing signal, the method can include (i) causing a video feed network to route the input video stream to the display driver, and (ii) causing the display driver to run the identified DVE.

In another aspect, an example display controller for use with an NPS is disclosed. The NPS can include a scheduling system, a display including a display panel, a display driver configured to provide an output video stream to the display panel, and a video feed network. The display controller can be configured to: (i) receive data from the scheduling system; (ii) identify, based on the received data, a DVE to be run by the display driver; (iii) in response to identifying the DVE, prompt a user for an input; (iv) receive a timing signal based on a user input; (v) responsive to receiving the timing signal, cause the video feed network to route the input video stream to the display driver; and cause the display driver to run the identified DVE. The display driver may run the identified DVE by using the input video stream, at least in part, to generate the output video stream for the display.

In another respect, a non-transitory computer-readable medium is disclosed. The non-transitory computer-readable medium can store instructions that, when executed by one or more processors, cause performance of operations. The operations can include receiving data from a scheduling system of an NPS. The operations can include identifying, based on the received data, a DVE to be run by a display driver for a display having a display panel. Running the identified DVE can involve using an input video stream, at least in part, to generate an output video stream for the display. The operations can include prompting a user for an input responsive to identifying the DVE. The operations can include receiving a timing signal based on a user input. The operations can include, in response to receiving the timing signal, (i) causing a video feed network to route the input video stream to the display driver, and (ii) causing the display driver to run the identified DVE.

In yet another aspect, an example method for operating a display including a display panel in a news production system (NPS) is disclosed. The method can include receiving data from a scheduling system of the NPS. The method can include identifying, based on the received data, a digital video effect (DVE) to be run by a display driver for the display, wherein running the identified DVE involves using an input video stream, at least in part, to generate an output video stream for the display. In response to identifying the DVE, the method can include: (i) causing a video feed network to route the input video stream to the display driver, and (ii) causing the display driver to run the identified DVE.

These as well as other aspects, advantages, and alternatives, will become apparent to those of ordinary skill in the art by reading the following detailed description, with reference where appropriate to the accompanying drawings.

DETAILED DESCRIPTION OF THE DRAWINGS

I. Overview

Figure 1:
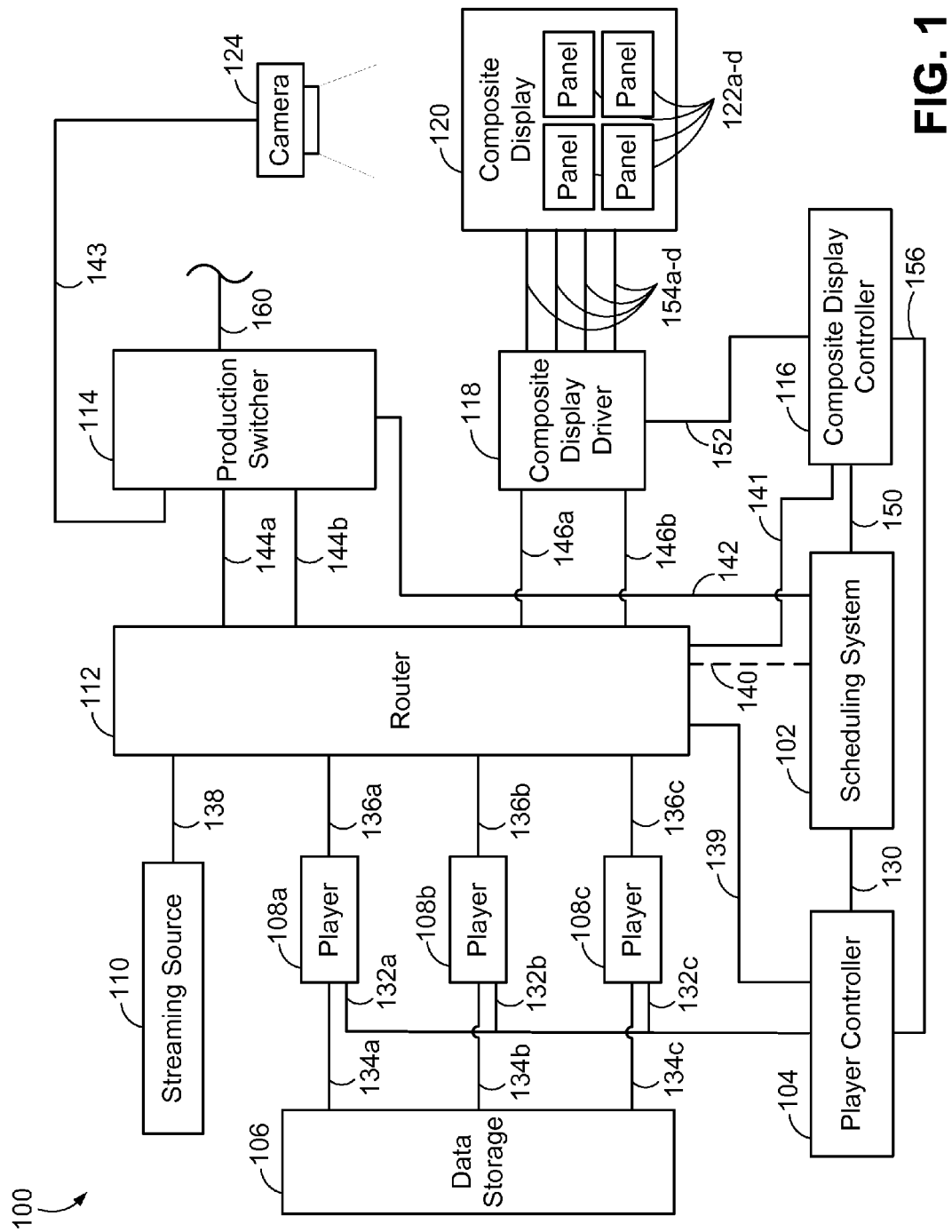
FIG. 1 is a simplified diagram of an example NPS.

As noted above, in some instances, visual aids may be used in connection with video capture events when producing a news program. One example of using a visual aid in this manner involves generating an output video stream that overlays specified video content on captured video of a news anchor. For example, the news anchor can be depicted in a boxed frame next to video of specified content. However, in such a set-up, the news anchor may not be able to view (and react) to the specified video content in real time without looking away from the camera fixed on them.

As another example, some NPSs may employ a green screen on which desired video content and/or images can be mapped, via video post-processing, while a news anchor is positioned in front of the green screen (i.e., between the camera and the green screen). Such systems may be employed, for example, to display a map and/or meteorological charts, diagrams, etc., while a meteorologist is positioned in front of the screen and describes the displayed content using gestures and the like. However, green screens suffer from limitations in that the video post-processing mapping techniques require that the green screen remain at a fixed location relative to the field of view of the camera. As a result, the camera capturing the green screen is limited to a fixed, unmoving perspective that is generally straight on. In addition, a news anchor may need significant training to make interaction with content on the green screen appear natural.

In another example, an NPS may employ a display panel configured to display video content. A news anchor can position himself near the display panel and describe the video content being rendered on the display panel. Such video content may include graphs, quotes, charts, videos, images, etc., that supplement and/or elucidate a news story. The physical proximity of the news anchor and the display panel allows the anchor to contextualize and/or highlight certain aspects using gestures (e.g., pointing, facial expressions).

In another example, an NPS may employ a composite display system that includes multiple individual display panels operated by a composite display driver in a coordinated fashion to jointly render video content. The composite display driver may receive an input video stream and instruct individual display panels in a given composite display system so as to jointly render the video content. The composite display driver may subdivide the video content and render a portion on each individual display panel. For example, a portion of each frame of a video may be displayed on each individual display panel such that the full frame is portrayed jointly by the group of displays panels. In addition to subdividing a video stream and distributing corresponding driving signals to each individual display panel, the composite display driver may also run a DVE so as to modify the input video stream(s) in a specified manner before using the modified video stream to generate video content for the panels in the composite display. For example, DVEs may be applied to adjust the position, scale, perspective, shading, coloring, etc., of one or more input video streams Composite display systems have traditionally been employed in concert and exhibition environments to render video content alongside performances. Typical composite display drivers are therefore adapted for use in these environments and may have limited integrative capabilities when used in other environments, such as NPS environments. Conventional composite display drivers may be unable to effectively communicate with an NPS scheduling system, which typically communicates with various automated modules traditionally found in an NPS environment using messages compliant with the Media Object Server (MOS) protocol. As a result, operating such composite displays on a news set in a manner coordinated with other automated modules in the NPS that are indicated by the scheduling system may be performed by operating the composite display driver in parallel with the NPS scheduling system.

Embodiments described herein help to facilitate at least partial regulation/control of the composite display (or a single display panel) in accordance with entries in a news program schedule. In practice, the composite display may be regulated/controlled by a controller, which sends command and control instructions to the composite display driver so as to cause the composite display to render particular video content. The composite display controller disclosed herein is further configured to communicate with other components in the presently disclosed NPS, such as a scheduling system or the like so as to allow the composite display to be integrated into the automated regulation/control of the NPS scheduling system.

In practice, the composite display controller (and/or another NPS device) may receive information based on a news program schedule entry from the scheduling system (and/or another NPS device). The composite display controller may then identify attributes in the received information, and then perform actions based on the information. For instance, a news program schedule entry may specify an event in which content is displayed using the composite display. The composite display controller may then send corresponding instructions to the composite display driver to prepare to run the DVE indicated by the entry and thereby cause the driver to recall the DVE. At or about the same time, the scheduling system (and/or another NPS device) may send a request to components in the NPS that provide streaming video to cause those sources to provide specified video and route the video to the composite display driver. The sources of streaming video and/or routers or other video stream routing components in the NPS may then queue the specified video content and provide feedback to the composite display controller regarding their readiness to provide the specified video content. Once ready, the composite display controller may provide a timing signal, which may be based in part on a user input, to initiate both the driver running the DVE and the streaming video source providing the input video stream. As a result, the two systems operate contemporaneously to render desired video content on the composite display. Moreover, the composite display controller may cause the video content to be routed to a particular input to the composite display driver, based on a particular DVE or other video effect to be rendered on the composite display, as indicated by the scheduling system.

Systems and techniques disclosed herein are not subject to limitations of conventional systems and allow for an NPS scheduling system to communicate with a composite display controller to effect coordination between various NPS subsystems and devices and an on-set composite display. As such, video content to be rendered on the composite display may be specified in advance by an entry in a news program schedule, along with other actions to be performed using the NPS. During production of an example news program, the scheduling system accesses news program schedule entries, and makes those entries available for other subsystems in the NPS, which then identify attributes in each entry and determine actions to be performed based on the identified attributes.

In some cases, a user interface is also provided to facilitate timing and/or synchronization of certain actions—such as to allow a producer to initiate the performance of one or more actions that various NPS systems perform on the basis of news program schedule entries. The user interface can thereby allow for some degree of manual control over aspects such as timing even as individual components in the NPS system dynamically configure themselves (without user input) to perform the functions specified by the news program schedule.

II. Example NPS

FIG. 1 is a simplified block diagram of an example NPS 100. The NPS 100 may be configured to perform a variety of functions related to producing a news program. The NPS 100 may output the news program in video form, which in turn may be sent to a television-broadcasting system for broadcast. It is understood that the video output from the NPS 100 may be subjected to additional processing before being broadcast. For example, the video may be modified by running a DVE using various devices before being broadcast.

The NPS 100 may include one or more devices, including for example a scheduling system 102, a player controller 104, a data storage 106, one or more players 108a-c, a streaming source 110, a router 112, a production switcher 114, a composite display controller 116, a composite display driver 118, a composite display 120, and a camera 124. The systems and devices in the NPS 100 may be configured to communicate between one or more others of the devices so as to cause the NPS 100 to carry out the functions described herein. Note that the NPS 100 need not include all of these devices and it may include additional devices.

The devices in the NPS 100 described herein may communicate with each other and/or with external devices via one or more communication paths. Generally, the communication paths between devices may be provided via wired and/or wireless communication in accordance with one or more communication protocols as necessary to achieve desired performance characteristics (e.g., bandwidth, latency). These devices may communicate with each other and/or with external devices according to one or more protocols. In some cases, the devices may communicate in accordance with one or more versions of the MOS protocol.

For example, as shown in FIG. 1, the scheduling system 102 and the player controller 104 may communicate via path 130, the player controller 104 and the players 108a-c may communicate via respective paths 132a-c, and the players 108a-c and the data storage 106 may communicate via respective paths 134a-c. Further, the players 108a-c and the router 112 may communicate via respective paths 136a-c. The streaming source 110 and the router 112 may communicate via path 138. The router 112 may communicate with the composite display driver 118 via respective paths 146a-b, and may communicate with the production switcher 114 via respective paths 144a-b. In addition, the router 112 may communicate with the player controller 104 via path 139 to exchange command and control information. In addition, the router 112 may optionally exchange command and control information by communicating with the scheduling system 102 (via path 140) and/or the composite display controller 116 (via path 141). The production switcher 114 can also communicate with the camera 124 via path 143. The scheduling system 102 and the production switcher 114 can communicate via path 142. The composite display driver 118 and the composite display 120 (and the individual display panels 122a-d) may communicate via respective paths 154a-d. The scheduling system 102 and the composite display controller 116 may communicate via path 150. The composite display controller 116 and the composite display driver 118 may communicate via path 152. And the composite display controller 116 and the player controller 104 may communicate via path 156.

A. Scheduling System

The scheduling system 102 is configured to perform functions related to scheduling and managing the production of a news program. For example, the scheduling system 102 may be configured to access a news program schedule (e.g., data that specifies a sequence and/or schedule of programming events involved in producing a news program). The scheduling system 102 may include a user interface to allow a user to generate the news program schedule. Once generated, the scheduling system 102 may store the news program schedule in a shared database and make the news program schedule available to be accessed by other components in the NPS 100. The NPS components can then access entries in the news program schedule, select one or more entries, read data associated with those entries, and determine actions to perform based on attributes in those entries (i.e., in the received data). As a result, the various components in the NPS 100 perform various actions corresponding to each entry in the sequence indicated by the news program schedule. In some cases, the timing of each event may further be controlled, at least in part, by the scheduling system (e.g., by specifying a particular number of seconds or frame times, or another measure of time between distinct events) or perhaps a user input may indicate a start time for one or more events (e.g., to facilitate timing control by a producer or other individual).

The scheduling system 102 may be alternately referred to herein as a "sequencing system" to reflect its role in setting the sequence of various events, but not necessarily the timing of those events, which may be based on an external input (e.g., a user input). Functionality of the scheduling system 102 to effect automated control of the NPS 100 (e.g., in accordance with a predetermined scripted sequence) is described further herein.

B. Video Sources

The player controller 104 is configured to perform functions related to controlling the video players 108a-c, which are configured to retrieve, decode, and play out specified video content. Video files accessible by the players 108a-c can be stored in the data storage 106, which may be a drive array storing encoded video files. Upon retrieving and playing out selected videos, the players 108a-c can provide output video streams to the router 112. The player controller 104 can operate in accordance with information from the scheduling system 102, provided via path 130. Similarly, the player controller 104 can provide respective command instructions via paths 132a-c to the players 108a-c, which cause the players 108a-c to locate and access stored video files via signals on paths 134a-c with the data storage 106. The players 108a-c can then output corresponding video streams communicated via paths 136a-c to the router 112.

Each player 108a-c may take a variety of forms. For instance, each player 108a-c may take the form of a video player device or a software-based video player executing on a computing device. The player controller 104 can dynamically allocate the players 108a-c to provide video streams from stored video clips (e.g., in the data storage 106) to various components in the NPS 100. In practice, the player controller 104 may evaluate entries in the news program schedule provided by the scheduling system 102 via path 130, determine, based on attributes in those entries, to load and play out particular video clips, and then allocate ones of the players 108a-c as necessary and available to provide the video streams specified by the news program schedule. As such, at various times, and based on the news program schedule entries, the player controller 104 may allocate ones of the players 108a-c to provide input video streams both to the production switcher 114 and the composite display driver 118, or to one or the other. The player controller 104 can then instruct the router 112, via path 13, to direct such video streams played out by ones of the players 108a-c to the production switcher 114 (via paths 144a-b) and/or the composite display driver 118 (via paths 146a-b). To facilitate efficient use of the players 108a-c, upon completion of playing out a given clip using a given player (e.g., due to completion of a composite display event or otherwise), the player controller 104 may further release the given player to allow it to be available for usage during a subsequent allocation of the players.

Additionally or alternatively, the router 112 can receive video signals via path 138 from a streaming source 110. The streaming source 110 can be configured to provide video that is received by the NPS 100 to be used substantially in real time, rather than pre-recorded video content that is stored in the data storage 106. For example, the streaming source 110 may include live captured video from a production crew reporting in real time from a newsworthy location.

Generally, the various video sources may be configured to queue a given source of video content in response to a suitable instruction from the player controller 104 (or another NPS module), which may operate based on an entry specified in a news program schedule. For example, the players 108a-c may load and buffer a given video clip from the data storage 106 in response to an instruction from the player controller 110 and/or the streaming source 110 may buffer a given video stream. In addition, the video sources may be configured to provide a feedback signal that indicates the readiness of the video source to provide a requested video stream. In practice, upon one of the players 108a-c loading and buffering a given video clip, the player may send an indication to the player controller 104 to indicate that the player is ready for playback.

C. Router

As noted above, the router 112 receives input video streams from the players 108a-c and/or the streaming source 110, and provides output video streams to the production switcher 114 and the composite display driver 118. Control signals via path 139 from the player controller 104 (and/or another sub-system with access to the news program schedule, such as the scheduling system 102, via path 140, or the composite display controller 116, via path 141) instruct the router 112 as to how to direct a given input to a given output at a given instant. For example, the router 112 may have multiple input channels and multiple output channels. At a given instant, the control signals via path 140 from the scheduling system 102 can instruct the router 112 as to which input channel(s) (e.g., the inputs corresponding to paths 136a-c, 138) to map to one or more of the output channel(s) (e.g., the outputs corresponding to paths 144a-b, 146a-b).

Video streams provided on the output ports at any given instant are thus based on one of the input streams to the router 112, in accordance with the instructions provided via path 139 (and/or optionally path(s) 140, 141). The router 112 thereby allows the player controller 104 to effect switching between the different inputs to different components in the NPS 100 at different times. And the player controller 104 may carry out such switching using the router 112 in accordance with an entry in the news program schedule, as provided via the scheduling system 102.

In some examples described herein, the components in the NPS 100 that function to provide input video streams to the composite display driver 118 and/or the production switcher 114 are referred to herein as a video feed network. For example, the video feed network may include, without limitation, the player controller 104, the data storage 106, the video players 108a-c, the streaming source 110, and/or the router 112, which function together to provide requested video streams (e.g., via respective outputs of the router 112) in accordance with entries in the news program schedule. Generally, multiple ones of the various networked components in the video feed network and/or in the NPS 100 may send and receive communications amongst one another to perform coordinated functions as described herein.

D. Composite Display

The composite display 120 can include multiple display panels 122a-d positioned adjacent one another and operated to jointly render video content provided via the composite display driver 118. That is, the individual display panels 122a-d can operate so as to display respective portions of a video content stream. In practice, the composite display driver 118 may sub-divide each frame of a video stream so as to render a portion of each frame on each of the display panels 122a-d. In operation then, the composite display 120 can appear similar to a single display panel that spans the region occupied by the panels 122a-d in which the separate panels 122a-d may or may not be evident. For example, the display panels 122a-d can be substantially co-planar with one another with respective active display surfaces oriented in a common direction. However, alternative configurations may also be employed.

Composite displays offer some performance advantages over a single display panel in a news set environment. In order to render video content in a manner that is readily captured by the camera 124, the individual display panels 122a-d are generally driven at a relatively high brightness setting to overcome washout from overhead lights. Due to the expense of display panels with high brightness capabilities, a composite display formed from multiple smaller display panels provides greater affordability and scalability than achievable using a single large display panel. In addition, using multiple individual display panels increases the effective resolution of the assembled composite display because the number of individual pixels in the resulting composite display is generally greater, for a given total display area, than achieved by a comparably-sized single display panel. Composite displays therefore mitigate pixilation and distortions even when a variety of camera perspectives are captured, including shots that zoom in on a sub-portion of the composite display.

The composite display driver 118 is a specialized video processor module configured to perform certain functions such as those described herein. The composite display driver 118 operates in accordance with instructions sent via path 152 from the composite display controller 116 (which itself may receive information from the scheduling systems 102). As such, the composite display 120, and the content rendered on the composite display 120, can be controlled by the scheduling system 102 (e.g., specified by a news program schedule or another predetermined sequence). The composite display driver 118 receives input video streams 146a-b from the router 112 and outputs display driver signals on paths 154a-d for the individual display panels 122a-d in the composite display 120. Video can be sub-divided across the panels 122a-d, such that the panels 122a-d jointly render an intended output video stream. The composite display driver 118 can be configured to operate a given one of the display panels 122a-d to display a respective portion (e.g. a sub-frame) of an output video stream such that the individual panels 122a-d in the composite display 120 are operated in coordination to jointly render the output video stream.

In some cases, the composite display driver 118 may first generate an output video stream based in part on the input video stream(s) (e.g., the video streams provided via paths 146a-b). Once generated, the output video stream can be subdivided into portions for each of the display panels 122a-

*d*, and re-sampled and/or converted as necessary to reduce distortion, etc. when rendered on the composite display 120. The composite display driver 118 may also be configured to sub-divide and/or re-sample in a manner that accounts for separations between adjacent ones of the individual panels 122*a-d* (e.g., due to bezels separating the display panels 122*a-d*).

In addition to providing the output video stream to the individual display panels 122*a-d*, the composite display driver 118 can be configured to run one or more DVEs using the incoming video stream(s). In some cases, the driver 118 may run a DVE by executing program instructions so as to generate an output video stream that is based, at least in part, on the incoming video stream(s). In practice, the execution of the program instructions can be executed so as to include modified versions of the incoming video stream(s) in the output video stream. For example, the composite display driver 118 may be configured to create the output video stream by applying scaling, positioning, perspective, shading, color-correction, and/or other effects to one or more input video streams. In one example, the output video stream for the composite display 120 may include multiple scaled framed windows overlaid on a background populated by scrolling text. Each window of video content can have a scaling, position, perspective, and/or color effect on the composite display 120.

Moreover, in some cases, the composite display 120 may be implemented using a single display panel, in which case the composite display driver 118 can apply DVE(s) and generate an output video stream for the single display panel without sub-dividing and/or re-sampling for rendering on multiple display panels. Such a single display panel may, in some cases, be a display panel with a native resolution different from the resolution of incoming video streams. For example, the display panel may have a resolution defined by an array of pixels with 2160 rows (e.g., an Ultra High Definition display panel with 3840 by 2160 pixels), and the incoming video streams may have a resolution defined by 1080 rows (1920 by 1080 pixels). In such an implementation, the display driver 118 may apply DVE(s) and resample and/or rescale the incoming video streams as necessary so as to generate an output video stream that corresponds to the native resolution of the single display panel.

Furthermore, in some cases the composite display driver 118 may be configured to run a predetermined set of DVEs, and each of the DVEs can be associated with a particular DVE identifier. For example, a given DVE identifier can be associated with a particular number of input video stream(s), provided on particular inputs to the composite display driver 118, and manipulated in accordance with a particular algorithm so as to generate output video streams to the display panels 122*a-d*. Upon the composite display controller 116 providing a given DVE identifier to the composite display driver 118 (e.g., by signaling via path 152), the composite display driver 118 may then recall the DVE associated with the given DVE identifier. Recalling the DVE may involve, for example, loading particular program instructions for the DVE and otherwise preparing to execute algorithms for the DVE. Then, the composite display driver 118 may receive a subsequent instruction to run the DVE (i.e., execute the algorithm and begin providing outputs to the composite display 120).

E. Composite Display Controller

To facilitate the operation of the composite display 120, the composite display controller 116 may communicate with the composite display driver 118 (via path 152), the player controller 104 (via path 156), and the scheduling system 102 (via path 150). In practice, during production of a news program the composite display controller 116 can receive data indicative of an upcoming event in which the composite display 120 is employed as an on-set visual aid. The received data may be provided by the player controller 104 (via path 156) after the player controller 104 evaluates a given news program schedule entry and identifies actions/events to be performed using the composite display 120. In some cases, the received data may be provided by the scheduling system 102 (via path 150) to evaluate such news program schedule entries. The received data may specify, for example, a DVE to be run by the composite display driver 118 using one or more input video streams. The composite display controller 116 can then inform the composite display driver 118 of the DVE to be run, for example by sending the composite display driver 118 a DVE indicator associated with the specified DVE.

At or about the same time, the composite display controller 116 and/or the player controller 104 can also send a request to the video feed network to route the input video streams to the composite display driver 118. The player controller 104 may reserve one or more of the video players 108*a-c* for use in providing the input video streams to the composite display driver 118 if the input video streams correspond to stored video clips. For example, the composite display controller 116 and/or player controller 104 may evaluate the DVE and determine a quantity of input video streams needed to run the DVE, and then reserve the determined quantity of video players so that those players are not allocated for other uses in the NPS 100. The player controller 104 may also instruct the router 112 to map the input channels on which the various input video streams are provided to the router 112 to particular output channels coupled to the composite display driver 118. In practice, the composite display driver 118 may be preconfigured to expect input video streams to be provided on particular ones of its inputs for each of the preconfigured DVEs the composite display driver 118 is configured to run. The player controller 104 may then determine, based on a given DVE to be run, which of the router output channels the video streams should be provided on to accommodate the configuration of the composite display driver 118, and instruct the router 112 accordingly.

In one example, to coordinate operation of the composite display 120, the composite display controller 116 first receives an indication of an upcoming DVE to be run (e.g., based on an entry in a news program schedule), then sends a corresponding DVE indicator to the composite display driver 118 to thereby cause the composite display driver 118 to recall that DVE and otherwise prepare to run the DVE. The player controller 104 can then communicate with the router 112 and/or video players 108*a-c* to arrange for an input video stream to be provided and routed to the composite display driver 118 at inputs that the composite display driver 118 is configured to expect. In some cases, the player controller 104 may initially cause the various video sources to queue the specified video content, and then wait for a readiness indicator from the video source, before instructing the video source to begin providing the video stream.

To render the desired content on the composite display 120, the player controller 104 and/or composite display controller 116 may facilitate coordinated operation of the composite display driver 118 and video feed network by sending timing signals to both at or about the same time. Such timing signals may cause the composite display driver 118 to begin running the DVE just as the video feed network begins providing the input video stream to the composite display driver 118, for example. In some examples, the timing signal may be initiated in response to receiving a user input from a user input device, perhaps after a user interface associated with the user input device provides a notification of the readiness indicator from the various video sources in the video feed network.

F. Camera

The camera 124 can be situated to capture a field of view that includes at least a portion of the composite display 120. For example, the composite display 120 can be situated on a news set, and the camera 124 can be positioned to capture a portion of the news set that includes the composite display 120. As such, video captured by the camera 124 can include any video content displayed via the composite display 120. While content is being displayed on the composite display 120, the scheduling system 102 can cause video captured using the camera 124 to be mapped to an output of the production switcher 114.

Moreover, a news anchor (or other individual) may also be within the field of view of the camera 124 (e.g., by standing in front of the composite display 120). So positioned, the news anchor may use the composite display 120 as a visual aid to enhance the discussion of news stories. For instance, graphs, videos, quotes, etc., may be displayed on the composite display 120 while a news anchor discusses news stories and gestures toward content on the composite display 120 to emphasize or deemphasize points as desired. Furthermore, news anchors can provide context for information on the composite display 120 by including commentary and analysis and by their reactions (e.g., facial reactions, gestures, postures).

G. Production Switcher

The production switcher 114 receives video input streams and uses the video input stream to generate a video output stream from the NPS 100, on path 160. The scheduling system 102 (or another component operating based on events specified in the news program schedule) can provide instructions to the production switcher 114 via path 142 to indicate which video stream (or multiple video streams) to use to generate the output video stream on path 160. The production switcher 114 can receive video inputs from the router 112 (e.g., streaming sources and/or pre-recorded played out videos via paths 144a-b) and also from the camera 124 (e.g., via path 143). The output video steam on path 160 may be subjected to further processing and may be passed to a broadcasting system.

In operation then, the scheduling system 102 may be configured to provide information (e.g., a news program schedule) to various components in the NPS 100 to cause the NPS 100 to operate such that specified stored or streamed video is rendered on the composite display panel 120. At or about the same time, the information can cause the production switcher 114 to use video from the camera 124, which captures at least a portion of the composite display 120 to generate the output video stream. The composite display 120 can thereby be operated in a substantially automated fashion to render specified video content using the same scheduling system 102 that regulates the other components of the NPS 100. As such, the composite display 120 can be readily integrated in to the NPS 100 to render content in accordance with a predetermined news program schedule.

H. Example NPS Device

Figure 2:
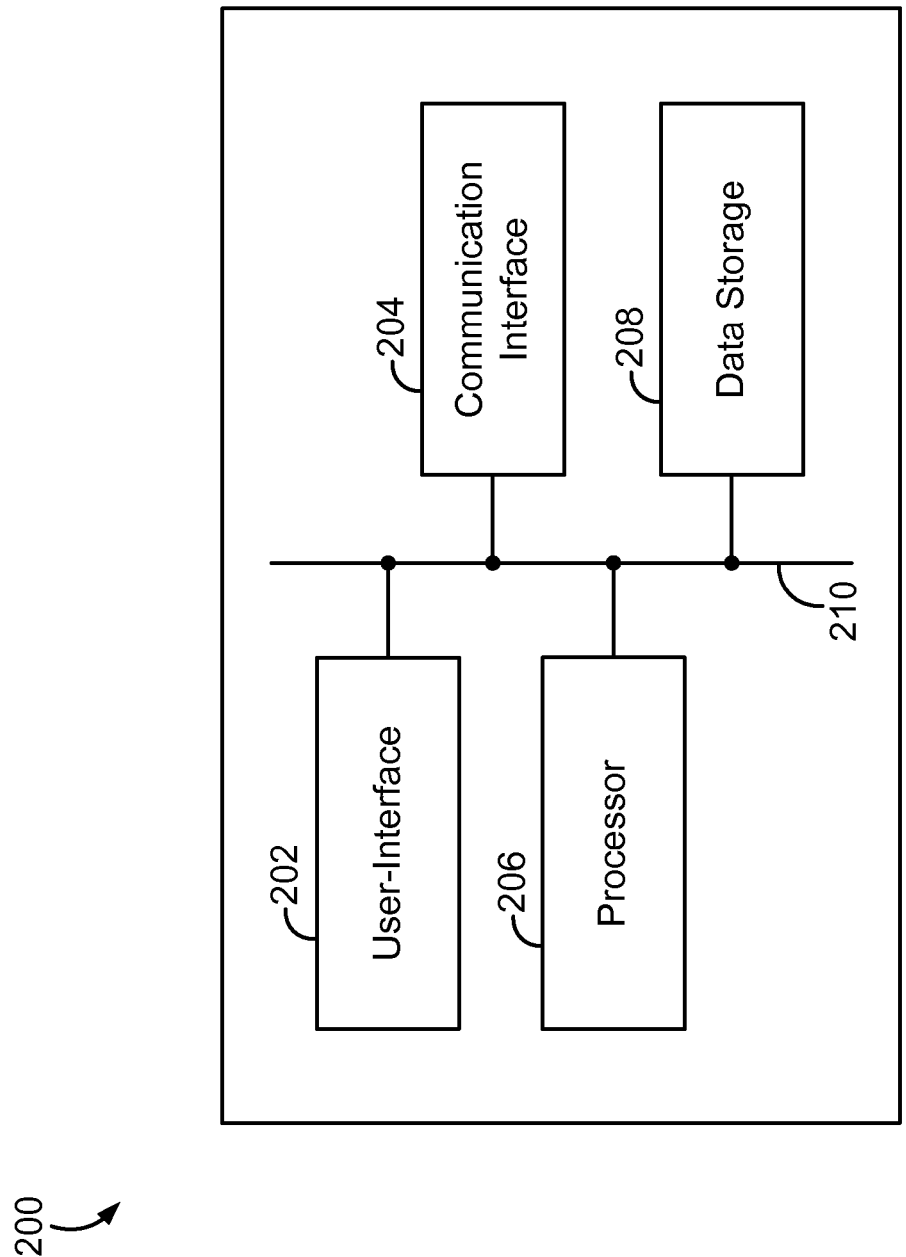
FIG. 2 is a simplified diagram of an example device of the NPS of FIG. 1.

FIG. 2 is a simplified block diagram of a device 200. The device 200 may take a variety of forms, including for example the scheduling system 102, the player controller 104, the data storage 106, one of the video players 108a-c, the streaming source 110, the router 112, the production switcher 114, the composite display controller 116, and/or the composite display driver 118.

The device 200 may include various components, including for example, a user-interface 202, a communication interface 204, a processor 206, and a data storage 208, all of which may be electronically connected to each other via a system bus or other connection mechanism 210. Note that the device 200 need not include all of these components and it may include additional components.

The user-interface 202 may function to allow the device 200 to interact with a user, such as to receive input from a user and to provide output to the user. Thus, the user-interface 202 may include input components such as a computer mouse, a keyboard, or a touch-sensitive panel. The user-interface 202 may also include output components such as a display screen (which, for example, may be combined with a touch-sensitive panel) or a speaker. In some cases, the user-interface 202 may be used by a producer or other newsroom personnel to provide inputs for control of timing or synchronization of certain events performed in accordance with news program schedule entries.

For instance, a producer (or director, etc.) may monitor events on a news set, such as the readiness of other personnel for certain events to be performed and/or status indicators of various NPS sub-systems (which status indicators may be communicated using output components of the user-interface 202). Once the producer judges that the conditions are ready for performance of a next event (or sequence of events) specified by one or more news program schedule entries, the producer can provide an input using the user-interface 202 (e.g., by pressing a button). Upon receipt of data indicating the user input, the NPS can then perform the particular event(s). Such user inputs are therefore referred to herein as timing signals or initiation signals. Moreover, in some cases events may be carried out following a predetermined delay after receipt of an initiation signal.

The communication interface 204 may function to allow the device 200 to communicate with other devices (e.g., over the paths described above). The communication interface 204 may be configured to transmit and/or receive various types of data, including for example control data or video stream data. In one example, the communication interface 204 may take the form of a wired interface, such as an Ethernet port, USB port, or HD-SDI port. As another example, the communication interface 204 may take the form of a wireless interface, such as a WiFi interface. In either case, the communication interface 204 may include communication input and/or communication output interfaces.

The processor 206 may include one or more general purpose processors (e.g., microprocessors) and/or one or more special purpose processors (e.g., digital signal processors (DSPs)).

The data storage 208 may include one or more volatile and/or non-volatile storage components, such as magnetic, optical, flash, or organic storage, and may be integrated in whole or in part with the processor 206. The data storage 208 may include removable and/or non-removable components. In some examples, the data storage 208 may include multiple storage drives that store data in a redundant and/or stripped configuration.

Generally, the processor 206 may be configured to execute program instructions (e.g., compiled or non-compiled program logic and/or machine code) stored in the data storage 208 to perform one or more of the functions described herein and/or shown in the accompanying drawings. As such, the data storage 208 may take the form of a non-transitory computer-readable storage medium, having stored thereon program instructions that, upon execution by the processor 206, cause the device 200 to perform one or more of the functions described herein and/or shown in the accompanying drawings.

III. Example News Set with Composite Display

Figure 3:
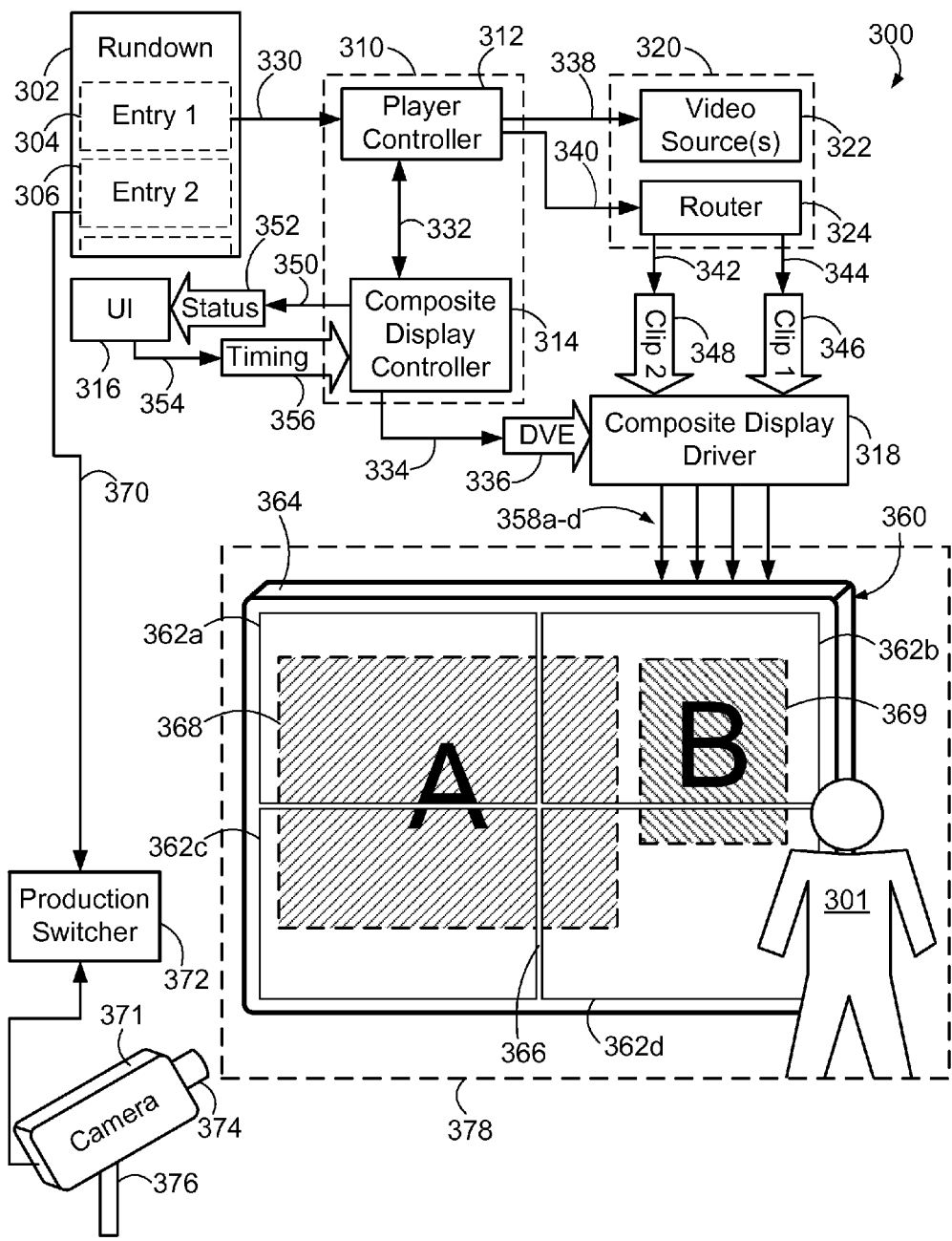
FIG. 3 symbolically illustrates an example process flow in which a composite display is utilized as a visual aid on a news set.

FIG. 3 illustrates an example NPS 300 in which a composite display is utilized as a visual aid on a news set. The NPS 300 can be the same as or similar to the NPS 100 described above in connection with FIG. 1, although some systems and devices are omitted from the illustration in FIG. 3 to emphasize signaling and information flow within the system 300 during an example operation.

The NPS 300 includes a production switcher 372 in connection with a camera 371 and a composite display 360 that is driven by a composite display driver 318 based on inputs from a composite display controller 314, which may indicate a DVE indicator 336, and on inputs from a video feed network 320, which may route video clips to the composite display driver 318 based on instructions from a player controller 312. The composite display 360, composite display driver 318, composite display controller 314, player controller 312, and production switcher 372 may be the same as or similar to the composite display 120, composite display driver 118, composite display controller 116, player controller 104, and production switcher 114, respectively, described above in connection with FIG. 1.

An example news program schedule 302 includes multiple entries 304, 306. The news program schedule 302 is used by a scheduling system (not shown), which may be the same as or similar to the scheduling system 102 described in connection with FIG. 1, to provide information to various components and sub-systems in the NPS 300 to thereby cause functions to be performed. The news program schedule 302 can include ordered entries, each represented as a separate row or otherwise delineated. Each entry includes one or more attributes, such as timing information (e.g., to indicate a start time of a particular action), video source information (e.g., a title, a clip identifier, a player identifier), router instructions (e.g., to map router inputs to router outputs so as to distribute video streams throughout the NPS 300), composite display information (e.g., indications of DVEs to run using one or more input video streams to generate an output video stream that is rendered on the composite display), and production switcher information. In one example, a user may create the news program schedule 302 via a user interface of a scheduling/sequencing system (e.g., the same as or similar to the scheduling system 102 described in connection with FIG. 1).

During operation, the entries in the news program schedule 302 can be accessed by a scheduling system and suitable information can then be provided to components in the NPS 300 to cause them to perform actions corresponding to each entry. For example, the first entry 304 can include attributes specifying a source of video to be played on the composite display 360 and a DVE to be run using the composite display driver 318. The second entry 306 can include attributes to cause video captured by the camera 371 to be used by a production switcher 372 in generating an output video stream from the NPS 300.

The player controller 312, the composite display controller 314, or a combination thereof, form a control component 310, which operates to regulate/control the operation of the composite display 360. The player controller 312 and the composite display controller 314 may communicate amongst one another as necessary using signals over path 332 to coordinate actions of each so as to cause the control component 310 to function as described herein. Upon receiving information based on the first entry 304, the control component 310 can identify attributes indicated by the first entry 304. The control component 310 can then generate signals to components in the NPS 300 to cause corresponding actions to be performed.

In practice then, the control component 310 functions to receive information from the entry 304 (e.g., via the signals on path 330), and, based on attributes included in the received information, identify a DVE to be run by the composite display driver 318 using input video stream(s) specified by the entry 304. The control component 310 can then send an indication to the composite display driver 318 to inform the composite display driver 318 of the identified DVE, which causes the composite display driver 318 to recall the identified DVE. For example, the composite display controller 314 can send a DVE indicator 336 to the composite display driver 318 via path 334.

The control component 310 can also cause the video feed network 320 to route the specified input video stream(s) to the composite display controller 318. For example, the video feed network 320 may include video source(s) 322 (e.g., video players and/or streaming video sources) and a router 324. To cause the video feed network 320 to route the specified video sources, the player controller 312 may send instructions to the video source(s) 322 over path 338 and to the router 324 over path 340. As a result of the instructions, the video source(s) may first queue the specified video content (e.g., load and buffer a video clip corresponding to the video content) and then output the video stream, and direct the video stream to the composite display driver 318 using the router 324. In the example depicted in FIG. 3, the identified DVE can specify two video streams corresponding to two stored video clips (e.g., a first video clip 346 and a second video clip 348). Upon instructions from the control component 310, the router 324 can then provide the two video streams 346, 348 to the driver over paths 342, 344.

In addition, the control component 310 may be associated with a user interface 316. The user interface 316 may include one or more user input devices (e.g., buttons, dials, touch-sensitive panels, voice-sensitive inputs) for receiving inputs from a user and one or more user output devices (e.g., displays, haptic feedback systems, audio output systems) for conveying outputs to a user. In operation, the user interface 316 may receive a status indicator 352 from the control component 310 over path 350. The status indicator 352 may be, for example, a readiness indicator indicating that the video feedback network 320 is queued to provide the specified video content. The status indicator 352 may additionally or alternatively include information indicating the status of other components in the NPS 300. Upon receiving the status indicator 352, the user interface 316 can provide a notification of the status indicator 352 to thereby inform the user of the information indicated thereby (such as a producer monitoring the functioning of the NPS 300). The user interface 316 can also receive an input, via its user input device. The input may, for example, generate a timing indicator 356 that is sent to the control component 310 via path 354. The timing indicator 356 may, for example, indicate a start time to begin routing video stream(s) to the composite display driver 318 and begin running the DVE.

The composite display 360 that is controlled by the control component 310 includes a frame or housing 364 to which individual display panels 362a-d are mounted adjacent to one another so as to form a combined display area. As shown in FIG. 3, the composite display 360 can have a rectangular display area sub-divided into quadrants and each quadrant can include a separate display panel. For example, the display panel 362a can be mounted in an upper left quadrant; display panel 362c can be mounted in a lower left quadrant; display panel 362b can be mounted in an upper right quadrant; display panel 362d can be mounted in a lower right quadrant. The edges between adjacent display panels (e.g., the display panels 362c and 362d) may be separated by a bezel 366. Each of the individual display panels 362a-d can then receive a respective separate driving signal 358a-d (e.g., a video stream corresponding to the respective quadrant for each display panel) from the composite display driver 318.

The production switcher 372 receives an input video stream from the camera 371 (among other inputs) and generates an output video stream, which may be sent to a broadcast system, for example. The camera 371 can be positioned to capture video of a field of view 378 that includes the composite display 360. The camera 371 can be mounted on an adjustable arm 376 that allows for adjusting the orientation and/or position of the camera 371. The camera 371 can also include a primary lens assembly 374 configured to focus incoming light from the field of view 378 onto a plane including a digital image sensor within the camera 371. The digital image sensor (e.g., CCD array, CMOS array) can then output data indicative of the light received during a series of frames to create a stream of the captured video (e.g., a stream of digital values indicative of the light received by the camera 371).

As represented in FIG. 3, the first entry 304 can include attributes specifying an event in which a DVE is run using two video clips formatted with a particular layout, and the resulting output video is rendered on the composite display 360. Upon receiving information based on the first entry 304, the control component 310 can generate and send the DVE indicator 336 to the composite display driver 318, which causes the composite display driver 318 to recall the identified DVE. The control component 310 can also generate and send video streams to the composite display driver 318 that are based on the two video clips: the first video clip 346 and the second video clip 348. For example, the control component 310 may request for the video feed network 320 to reserve two software video players, and the reserved video players may then retrieve, decode, and play out the specified video clips 346, 348. The video streams based on the two video clips 346, 348 can then be routed to particular inputs of the composite display driver 318 that are associated with the identified DVE. For instance, the control component 310 may have a lookup table or the like that associates each DVE that the composite display driver 310 is preconfigured to run with particular inputs to the composite display driver 318 on which the composite display driver 318 expects to receive input video streams when running such DVEs. Running the DVE may involve, for example, arranging the incoming video streams in accordance with a particular layout. The layout may provide, for instance, a particular position, color effect, size, scaling, perspective, shading, etc. with which to arrange the input video streams when rendered on the composite display 360.

The DVE indicator 336 provided to the composite display driver 318 may cause the composite display driver 318 to arrange the video streams of the two clips 346, 348 on the composite display 360 in accordance with a particular preconfigured format. For example, the first entry 304 can specify a size or scaling factor of the clip and/or a position on the composite display 360. Upon recognizing the DVE indicator 336, the composite display driver 318 can recall particular program instructions and/or algorithms for causing the associated video effects. The layout specified with the DVE indicator 336 may specify that the stream from the first clip 346 is rendered at a first absolute or relative position on the display area of the composite display 360 while the stream from the second clip 348 is rendered at a second absolute or relative position on the display area. With the DVE recalled, the composite display driver 318 is configured to receive the video streams corresponding to the clips 346, 348 and generate output video streams to the composite display 360 (e.g., by providing the driver signals over paths 358a-d to the respective display panels 362a-d) so as to cause the video streams corresponding to the clips 346, 348 to be rendered according to the layout for the identified DVE.

Additionally or alternatively, the DVE indicator 336 may specify a "trapezoidal scaling" to apply a perspective to the rendered video streams. For example, rather than rendering the clips within a rectangle having equal widths along top and bottom edges and equal heights along left and right edges, the trapezoidal squeeze may scale a video into a shape with unequal top and bottom edges and/or unequal left and right edges. Such a trapezoidal effect may cause the clip to be rendered from a perspective view. Moreover, clips may be rendered with some degree of cropping, such as by rendering a rectangular source video within a region shaped as a square (e.g., by cropping away side edges of the source video), circle, oval, ellipse, polygon, or any other closed shape.

Further still, as noted above, the DVE indicator 336 may indicate one of a group of preconfigured DVEs. For instance, the composite display driver 318 may be preconfigured to recognize (and perform suitable DVEs to carry out) a group of DVEs so as to provide commonly employed layout templates. Each template may then be associated with a DVE indicator which corresponds to a particular scaling, positioning, perspective, and so on of a particular number of input video streams provided via particular inputs to the composite display controller 318.

An example layout is shown in FIG. 3 in which the first clip 346 is represented by a first hashed region 368 including the letter "A" and the second clip 348 is represented by a second hashed region 369 including the letter "B." The position and size (e.g., scaling) of each clip, among other factors, can be specified by the DVE indicator 336 based on a saved configuration of the composite display driver 318. The composite display driver 318 can be configured to apply DVEs sufficient to cause the clips to be rendered in the specified layout. As shown in FIG. 3, the first clip (indicated by the letter "A") may be rendered in the region 368 that spans multiple ones of the individual display panels 362a-d.

Further still, a static or dynamic background may be included and static or dynamic text, logos, other visual content, etc., may be included on the background and/or superimposed over the clip-filled regions 368, 369. The resulting output video streams incorporating the clip(s) in accordance with the layout and/or template specified by the DVE indicator 336 is then suitable for rendering using the composite display 360. In some examples, the control component 310 may provide timing information, perhaps based in part on the user interface 316, to specify that the video streams corresponding to the clips 346, 348 be routed to the composite display driver 318 during a period that is contemporaneous (e.g., overlaps in time) with the period in which the composite display driver 318 runs the DVE(s) specified by the DVE indicator 336.

Upon accessing the second entry 306, the scheduling system or another component of the NPS 300 can identify attributes indicated by the second entry 306. Based on the attributes identified, the component(s) of the NPS 300 can then send signals to cause actions to be performed in accordance with the second entry 306. For example, signals may be sent to the production switcher 372 (via path 370) so as to cause the production switcher 372 to receive video captured by the camera 371, and to use the captured video to generate an output video stream from the NPS 300. In particular, the second entry 306 may specify that the production switcher 372 use camera-captured video of the field of view 378 while the composite display 360 renders the video content specified by the first entry 304. The field of view 378 can include both the composite display 360 and a news anchor 301 (or other individual) who uses the composite display 360 as a visual aid in presenting news topics. For example, the news anchor 301 may discuss news stories while gesturing toward videos, graphs, quotes, photos, other visual aids, etc., that are rendered on the composite display 330. In some examples, the composite display 360 may display video from a field correspondent, who may then converse (or otherwise interact) with the news anchor 301.

In some cases, the first and second entries 304, 306 include timing information to cause the performance of the corresponding actions (rendering specified video content on the composite display 360 and providing an output video stream based on capturing video of a scene including the composite display 360) to be carried out contemporaneously. In some cases, the initiation of one or both of the actions indicated by the entries 304, 306 may be at least partially based on an external input, such as an input received via the user interface 316 associated with the control component 310. Upon initiation, the timing information may specify an ordering and/or pre-determined delay before starting a next action (e.g., timing information may specify that the action associated with the second entry 306 commences at the same time the action associated with the first entry is initiated). For example, the timing information may cause the composite display 360 to begin displaying specified video content substantially simultaneously with the production switcher 372 switching to generate an output stream based on camera-captured video of the composite display 360. In another example, the period in which specified video content is rendered on the composite display 360 can at least partially overlap with a period in which the output video stream is based on video captured by the camera 371.

It is also noted that the news program schedule 302 has been greatly simplified for the purposes of providing an illustrative example of the disclosed system in connection with FIG. 3. In practice, a news program schedule is likely, although not required, to include a variety of data and data types generated in a semi-automated manner using a user interface to populate various fields associated with each entry. For example, news program schedule entries may include additional attributes, including for example, an index or "page" number, an estimated duration, an actual duration, and/or an author, some or all of which may be used to generate instructions to components in the NPS 300 and some or all of which may be used for other purposes, such as diagnostics, archiving, etc. However, for the sake of simplicity, the news program schedule 302 is illustrated in simplified form.

IV. Example Operations

Figure 4:
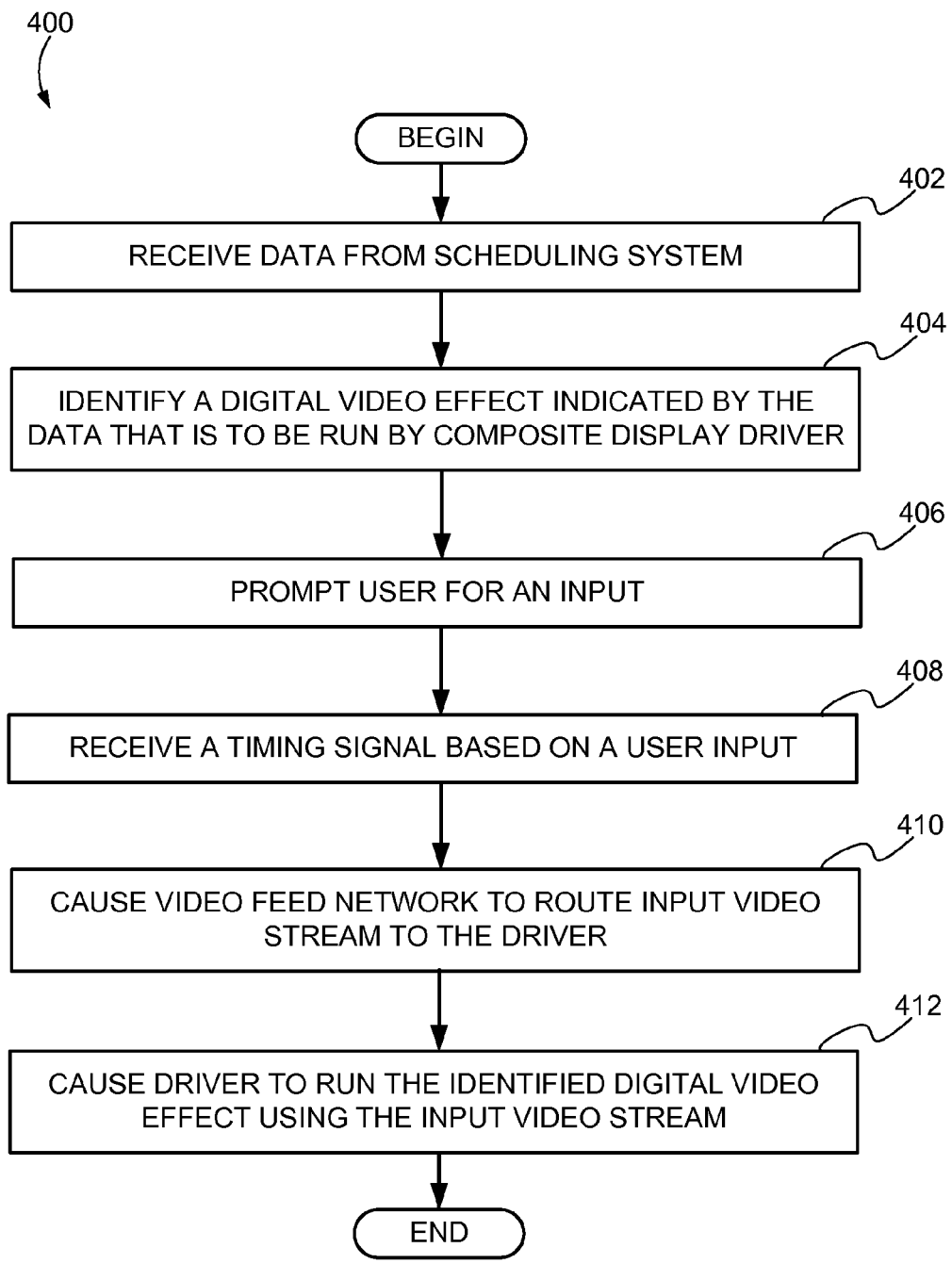
FIG. 4 is a flowchart of an example process that may be performed by an NPS.

FIG. 4 is a flowchart of an example process 400 that may be performed by the NPSs described herein. For example, the process 400 may be performed by NPS 100 described above in connection with FIG. 1 and/or the NPS 300 described above in connection with FIG. 3. In particular, the process 400 may be performed by a composite display controller in such NPSs, such as the composite display controllers 116, 318, alone or in combination with a player controller, such as the player controllers 104, 312.

At block 402, the process 400 may involve receiving data from a scheduling system. For example, a computing system associated with a scheduling system for the NPS can access a news program schedule that includes entries indicative of a sequence of events to be carried out by the NPS. Data based on the entries can then be provided to NPS components, such as a player controller and/or composite display controller.

At block 404, the process 400 may involve identifying a DVE to be run by the composite display driver based on the received data. For example, the composite display controller or another device may identify particular attributes in the received data and determine that the data indicates the DVE on that basis. The identified DVE may involve the composite display controller using one or more input video streams, at least in part, to generate output video streams to the display panels in the composite display.

At block 406, the process 400 may involve prompting a user for an input identifying the DVE. For example, a user interface may be used to prompt a user to initiate the composite display event by providing a user input to be used as a timing signal. At block 408, the process 400 may involve receiving a timing signal based on a user input. For instance, the user may press a button or the like, and the timing of the button press may be used to generate a timing signal or initiation signal to the composite display driver, router, player controller, and/or other devices in the NPS involved in performing the function(s) involved in rendering content on the composite display.

In response to receiving the timing signal, the process 400 may involve: causing a video feed network to route the input video streams specified by the identified DVE to the composite display driver (block 410), and causing the composite display driver to run the identified DVE (block 412). For example, the player controller and/or composite display controller may cause players to retrieve and play back stored video clips or may cause streaming video sources to begin buffering their respective video content. The player controller and/or composite display controller may also instruct a router to direct the video streams provided by such video source(s) to map those video streams to inputs of the composite display driver to thereby allow the composite display driver to run the identified DVE. The driver running the DVE may involve the driver using the input video stream(s), at least in part, to generate multiple output video streams. Each of the multiple output video streams can be provided to a corresponding one of the plurality of display panels in the composite display. The method may involve rendering the output video streams on the respective display panels of the composite display. The resulting display panels in the composite display can thereby jointly display the video content specified by the data received in block 402.

V. Example Variations

While one or more functions have been described as being performed by certain devices or entities (e.g., the scheduling system 102), the functions may be performed by any device or entity, such as those included in the NPS 100 or the NPS 300 described above.

In some embodiments, a given news program schedule entry may specify a single action to be performed by the NPS. In other embodiments, a given entry may specify multiple actions to be performed and such actions may be performed sequentially, simultaneously, or in another manner as specified by the entry. Thus, some embodiments may include using a single entry to facilitate both rendering of content on the video display and using captured video from the camera to generate a video output stream from the production switcher, rather than using separate entries for each as described in connection with FIG. 3. Moreover, some embodiments may include using multiple entries to facilitate performance of action(s) described as associated with a single entry herein.

In some embodiments, the NPS may include a single display panel instead of a composite display, or perhaps in addition to a composite display, used as a visual aid on a news set. In such embodiments, the NPS can function in accordance with entries in a news program schedule to provide specified input video stream(s) to a display driver, and then the display driver can run specified DVEs using the input video stream(s), and generate an output video stream to be rendered on the single display panel. Thus, the functions described in connection with the description of a composite display and a composite display driver may be extended to functions performed of a single display panel operated by suitable display driver. In particular, many functions described herein as being performed by a composite display driver (e.g., running DVEs in accordance with an entry in a news program schedule) may instead be performed by a display driver suitable for generating video to be rendered on a single display panel. And similarly, many functions described herein as being performed by a composite display (e.g., rendering an output video stream provided by the display driver) may instead be performed by a single display panel.

Further, while examples of the disclosed method have been described in connection with an NPS, examples of the method may be implemented in other environments.

Also, the functions need not be performed in the disclosed order, although in some examples, an order may be preferred. And not all functions need to be performed to achieve the desired advantages of the disclosed system and method, and therefore not all functions are required. For instance, the method described in connection with FIG. 4 may be altered by omitting certain blocks, such as blocks 406 and 408, in which case the timing of the remaining blocks may not be dependent on a timing signal derived from a user input.

It should also be noted that the variations described in connection with select examples of the disclosed system and method may be applied to all other examples of the disclosed system or method.

Further, while select examples of the disclosed system and method have been described, alterations and permutations of these examples will be apparent to those of ordinary skill in the art. Other changes, substitutions, and alterations are also possible without departing from the disclosed system and method in its broader aspects as set forth in the following claims.

What is claimed is:

1. A method for operating a display including a display panel in a news production system (NPS), the method comprising:
   receiving data from a scheduling system of the NPS;
   identifying, based on the received data, a digital video effect (DVE) to be run by a display driver for the display, wherein running the identified DVE involves using an input video stream, at least in part, to generate an output video stream for the display;
   responsive to identifying the DVE, prompting a user for an input;
   receiving a timing signal based on a user input; and
   responsive to receiving the timing signal: (i) causing a video feed network to route the input video stream to the display driver, and (ii) causing the display driver to run the identified DVE.

2. The method of claim 1,
   wherein the video feed network comprises a router having an input channel and multiple output channels, wherein the router is configured to direct incoming video streams received via the input channel to one of the output channels, and
   wherein causing the video feed network to route the input video stream to the display driver comprises, while the input video stream is provided to the input channel, causing the router to map the input channel to a particular one of the output channels that is coupled to the display driver.

3. The method of claim 1, further comprising:
   determining, based on the identified DVE, a particular one of multiple inputs to the display driver on which to route the input video stream, wherein the video feed network comprises a router having an input channel and multiple output channels coupled to respective ones of the multiple inputs to the display driver, wherein the router is configured to direct incoming video streams received via the input channel to one of the output channels; and
   wherein causing the video feed network to route the input video stream to the display driver comprises, while the input video stream is provided to the input channel, causing the router to map the input channel to a particular output channel coupled to the determined particular one of the inputs to the display driver.

4. The method of claim 1, further comprising:
   prior to causing the display driver to run the identified DVE, providing, to the display driver, an indication of the identified DVE to thereby cause the display driver to recall the identified DVE.

5. The method of claim 1, wherein receiving data from the scheduling system comprises:
   accessing a news program schedule stored in a database associated with the scheduling system;
   selecting an entry in the news program schedule; and
   reading data associated with the selected entry.

6. The method of claim 1, wherein the display is a composite display and the display panel is one of multiple display panels included in the composite display, and wherein the display driver running the DVE further involves the display driver: (i) using the input video stream, at least in part, to generate multiple output video streams, and (ii) providing the output video streams to the display panel, wherein each of the multiple output video streams is provided to a corresponding one of the multiple display panels.

7. The method of claim 1, further comprising:
   responsive to identifying the DVE, determining that the input video stream corresponds to a stored video clip and reserving a video player from a group of multiple video players each configured to retrieve and play stored video clips; and
   causing the reserved video player to play the stored video clip and thereby provide the input video stream.

8. The method of claim 7, further comprising:
   prior to causing the reserved video player to play the stored video clip, causing the reserved video player to load the stored video clip;
   receiving a readiness indication, from the reserved video player, that the reserved video player is loaded to provide the input video stream; and
   responsive to receiving the readiness indication, using a user interface to provide a notification based on the readiness indication.

9. The method of claim 1, wherein the identified DVE involves using multiple input video streams contemporaneously to generate the output video streams, wherein the method further comprises:

determining, based on the identified DVE, for each of the input video streams, a particular one of multiple inputs to the display driver on which to route the input video stream, wherein the video feed network comprises a router having multiple input channels and multiple output channels coupled to respective ones of the multiple inputs to the display driver, wherein the router is configured to direct an incoming video stream received via a given one of the input channels to one of the output channels; and causing the video feed network to route the input video streams to the display driver by, for each of the input video streams, while the input video stream is provided to a given one of the input channels, causing the router to map the given one of the input channels to a particular output channel coupled to the determined particular one of the inputs to the display driver.

10. The method of claim 1, wherein the identified DVE is one of a set of DVEs each associated with a DVE indicator, wherein the display driver is configured to associate a given DVE indicator with (i) particular inputs to the display driver on which input video streams for the given DVE are provided to the display driver, and (ii) a particular layout template in which the input video streams are arranged within the output video streams from the display driver, wherein the method further comprises:

prior to causing the display driver to run the identified DVE, sending, to the display driver, an indication of the DVE indicator associated with the identified DVE to thereby cause the display driver to recall the identified DVE.

11. A display controller for use with a news production system (NPS) comprising: (i) a scheduling system; (ii) a display including a display panel; (iii) a display driver configured to provide an output video stream to the display panel; and (iv) a video feed network;

wherein the display controller is configured to: (i) receive data from the scheduling system; (ii) identify, based on the received data, a digital video effect (DVE) to be run by the display driver, wherein running the identified DVE involves using an input video stream, at least in part, to generate an output video stream for the display; (iii) in response to identifying the DVE, prompt a user for an input; (iv) receive a timing signal based on the user input; and (v) responsive to receiving the timing signal, cause the video feed network to route the input video stream to the display driver, and cause the display driver to run the identified DVE.

12. The display controller of claim 11, wherein the video feed network comprises a router having an input channel and multiple output channels, wherein the router is configured to direct incoming video streams received via the input channel to one of the output channels, and wherein the display controller is configured to, while the input video stream is provided to the input channel, cause the router to map the input channel to a particular one of the output channels that is coupled to the display driver and thereby cause the video feed network to route the input video stream to the display driver.

13. The display controller of claim 11, further configured to:

determine, based on the identified DVE, a particular one of multiple inputs to the display driver on which to route the input video stream, wherein the video feed network comprises a router having an input channel and multiple output channels coupled to respective ones of the multiple inputs to the display driver, wherein the router is configured to direct incoming video streams received via the input channel to one of the output channels; and while the input video stream is provided to the input channel, cause the router to map the input channel to a particular output channel coupled to the determined particular one of the inputs to the display driver and thereby cause the video feed network to route the input video stream to the display driver.

14. The display controller of claim 11, further configured to:

prior to causing the display driver to run the identified DVE, provide, to the display driver, an indication of the identified DVE to thereby cause the display driver to recall the identified DVE.

15. The display controller of claim 11, further configured to receive data from the scheduling system by:

accessing a news program schedule stored in a database associated with the scheduling system;
selecting an entry in the news program schedule; and
reading data associated with the selected entry.

16. The display controller of claim 15, wherein the display is a composite display and the display panel is one of multiple display panels included in the display; and wherein the display driver is further configured to: (i) use the input video stream, at least in part, to generate multiple output video streams, and (ii) provide the output video streams to the display panel, wherein each of the multiple output video streams is provided to a corresponding one of the multiple display panels.

17. The display controller of claim 11, further configured to:

responsive to identifying the DVE, determine that the input video stream corresponds to a stored video clip and reserve a video player from a group of multiple video players each configured to retrieve and play stored video clips; and cause the reserved video player to play the stored video clip and thereby provide the input video stream.

18. The display controller of claim 11, wherein the identified DVE involves using multiple input video streams contemporaneously to generate the output video streams, wherein the composite display controller is further configured to:

determine, based on the identified DVE, for each of the input video streams, a particular one of multiple inputs to the display driver on which to route the input video stream, wherein the video feed network comprises a router having multiple input channels and multiple output channels coupled to respective ones of the multiple inputs to the driver, wherein the router is configured to direct an incoming video stream received via a given one of the input channels to one of the output channels; and cause the video feed network to route the input video streams to the display driver by, for each of the input video streams, while the input video stream is provided to a given one of the input channels, causing the router to map the given one of the input channels to a particular output channel coupled to the determined particular one of the inputs to the display driver.

19. The display controller of claim 11, wherein the identified DVE is one of a set of DVEs each associated with a DVE indicator, wherein the display driver is configured to associate a given DVE indicator with (i) particular inputs to the display driver on which input video streams for the given DVE are provided to the display driver, and (ii) a particular layout template in which the input video streams are arranged within the output video streams from the display driver, wherein the composite display controller is further configured to:

prior to causing the display driver to run the identified DVE, send, to the display driver, an indication of the DVE indicator associated with the identified DVE to thereby cause the driver to recall the identified DVE.

20. A non-transitory computer-readable medium storing instructions that, when executed by one or more processors, cause performance of operations comprising:

receiving data from a scheduling system of a news production system (NPS);

identifying, based on the received data, a digital video effect (DVE) to be run by a display driver for a display having a display panel, wherein running the identified DVE involves using an input video stream, at least in part, to generate an output video stream for the display;

responsive to identifying the DVE, prompting a user for an input;

receiving a timing signal based on a user input;

responsive to receiving the timing signal: (i) causing a video feed network to route the input video stream to the display driver, and (ii) causing the display driver to run the identified DVE.

* * * * *